J. J. B. MULDERIG.
AUXILIARY AIR VALVE.
APPLICATION FILED FEB. 18, 1916.

1,242,839.

Patented Oct. 9, 1917.

Witnesses
J. L. Wright
P. M. Smith

Inventor
J. J. B. Mulderig
By Victor J. Evans
Attorney

UNITED STATES PATENT OFFICE.

JOHN J. B. MULDERIG, OF WILKES-BARRE, PENNSYLVANIA.

AUXILIARY AIR-VALVE.

1,242,839.

Specification of Letters Patent.

Patented Oct. 9, 1917.

Application filed February 18, 1916. Serial No. 79,199.

*To all whom it may concern:*

Be it known that I, JOHN J. B. MULDERIG, a citizen of the United States, residing at Wilkes-Barre, in the county of Luzerne and State of Pennsylvania, have invented new and useful Improvements in Auxiliary Air-Valves for Internal-Combustion Engines, of which the following is a specification.

This invention relates to auxiliary air valves for internal combustion engines, the object in view being to produce a simple self-adjusting valve which will admit air to the intake of an internal combustion engine just beyond the carbureter whereby the richness of the mixture is reduced or diluted between the carbureter and the engine proper, effecting a material saving in the consumption of gasolene, promoting combustion and overcoming the rapid accumulation of carbon within the combustion chamber or chambers and around the pistons, valves and other adjacent parts, thereby maintaining the engine as a whole at its greatest efficiency for a long period of time.

The valve hereinabove described opens and closes in accordance with the demands of the engine and in accordance with the suction produced by the piston speed, rendering it unnecessary to adjust the carbureter from day to day on account of climatic changes. Furthermore, the valve proper is adjustable by means of a tension spring so as to adapt the valve to engines of different power.

With the above and other objects in view, the invention consists in the novel construction, combination and arrangement of parts, as herein described, illustrated and claimed.

In the accompanying drawings:—

Figure 1:
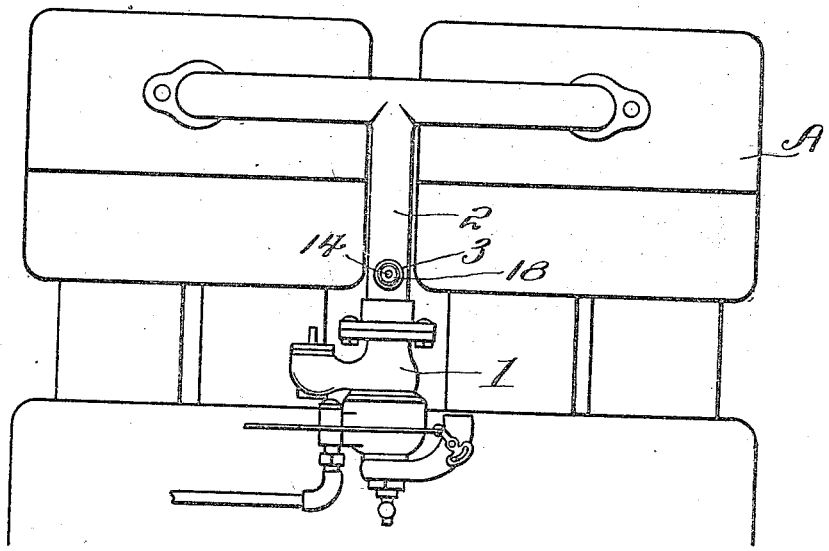
Figure 1 is a side elevation of an internal combustion engine showing the relation of the valve of this invention thereto.
Figure 2:
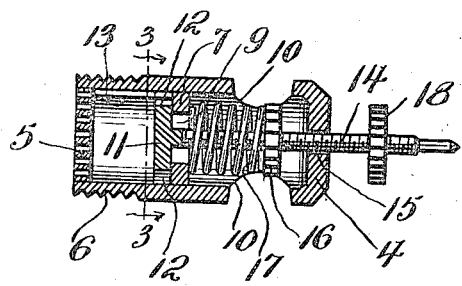
Fig. 2 is an enlarged diametrical section through the valve casing and valve body, showing other parts in elevation.
Figure 3:
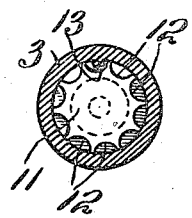
Fig. 3 is a cross section on the line 3—3 of Fig. 2.

Referring to the drawings A designates an internal combustion engine which is conventionally shown as provided with the usual carbureter 1 and intake pipe 2. Between the carbureter and the engine and preferably close to the carbureter I arrange the auxiliary air valve which comprises a tubular casing 3 preferably in the form of a hollow cylinder closed at its outer end by an end wall 4 and having the inner end wall 5 thereof foraminous or formed with a large number of small perforations through which the air enters the intake pipe of the engine and whereby the air is divided into a number of jets to break up the fuel before the latter reaches the engine.

The valve casing 3 is threaded at its inner end as shown at 6 to adapt it to be screwed into an opening in the intake pipe and is provided between the ends thereof with an internal valve seat 7 which is shown as having a flat working face and a single central opening 9. The casing 3 is further provided with diametrically opposite air inlet and finger receiving orifices 10 the purpose of which will more clearly appear hereinafter.

11 designates the valve body which is generally in the form of a flat disk but provided along its margin or periphery with notches 12, which serve to scatter and distribute the air before reaching the perforated wall 5 one of said notches receiving a rib or key 13 extending lengthwise of the inner wall of the casing 3 and coöperating with the valve body 11 to prevent said valve and the stem thereof from turning when an adjustment is being effected. A stem 14 projects from the valve body 11 outwardly through a small opening 15 in the outer end wall or head 4 of the casing and said stem 14 is threaded to receive a tensioning nut 16 which is located within the casing 3. A helical expansion spring 17 is confined between the valve seat 7 and the tensioning nut 16 and acts to return the valve body 11 into contact with the valve seat as the engine is throttled down. Exteriorly of the casing 3 the stem 14 is provided with a limiting lock nut 18. By adjusting the nut 18 longitudinally of the stem 14, the degree of movement of the valve 11 may be regulated and by continuing the movement of the nut 18 until it bears against the end wall 4 of the casing, the valve 11 will be locked in its closed position for enabling the engine to be started, at which time it is important to charge the combustion chambers of the cylinders of the engine with a highly explosive or rich mixture. After the engine has been started, the nut 18 may be adjusted outwardly toward the end of the stem 14 in order to give as much play as necessary to the valve 11.

The orifices 10 in the opposite sides of the casing 3 provide for the insertion of the thumb and fore finger of the operator for the purpose of turning the nut 16 which is preferably in the form of a disk having a milled edge as shown. Said orifices also serve to admit a supply of air to the inside of the casing 3, said air supply passing through the opening 9 in the valve seat as the valve body 11 moves away from said seat.

The purpose of scalloping or notching the periphery of the valve body 11 is to cause the air to be deflected outwardly by the valve body against the inside wall of the valve casing and divide the same into a large number of jets. These jets are then further divided into smaller jets by the perforations in the foraminous inner end wall of the casing. The whole effect is to thoroughly break up the air into small jets before entering the intake pipe or manifold of the engine thus obtaining a better effect of the air on the explosive mixture between the time it leaves the carbureter and the time it enters the combustion chamber or chambers of the engine.

What I claim is:—

1. A valve for the purpose specified embodying a casing having an internal valve seat and a foraminous inner end wall in spaced relation to said valve seat, and a spring seated valve coöperating with said valve seat between the latter and the foraminous end wall, said valve having a notched periphery, notches in the periphery of the valve being of greater capacity than the perforations in the foraminous end wall of the casing and being covered by the valve seat when the valve is in its closed position.

2. A valve for the purpose specified, embodying a casing having an internal valve seat and closed at its outer end and also formed with air inlet and finger admission orifices in the side walls thereof diametrically opposite each other, a valve coöperating with said seat and having a threaded stem extending through an opening in the end wall of the valve casing, a nut threaded on said stem within the casing and manually operable through said finger admission orifices, and a valve seat spring interposed between said nut and valve seat.

In testimony whereof I affix my signature in presence of two witnesses.

JOHN J. B. MULDERIG.

Witnesses:
R. L. MILLIMAN,
H. SCHANZLIN.